(12) United States Patent
Someya (10) Patent No.: US 7,542,524 B2
(45) Date of Patent: Jun. 2, 2009

(54) RADIO WAVE RECEIVER, RADIO WAVE RECEPTION INTEGRATED CIRCUIT, WAVE CLOCK, AND REPEATER

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 741 days.

(21) Appl. No.: 10/979,920

(22) Filed: Nov. 1, 2004

(65) Prior Publication Data

US 2005/0101255 A1 May 12, 2005

(30) Foreign Application Priority Data

Nov. 11, 2003 (JP) ............................. 2003-381021

(51) Int. Cl.
*H04L 27/00* (2006.01)
(52) U.S. Cl. ...................... 375/326; 375/316; 375/346; 375/324
(58) Field of Classification Search ................. 375/316, 375/346, 326, 324; 455/39, 63.1
See application file for complete search history.

(56) References Cited

U.S. PATENT DOCUMENTS 5,500,877 A * 3/1996 Park ............................ 375/343
6,320,842 B1 * 11/2001 Mochizuki ................... 370/206
7,251,295 B2 * 7/2007 Jun ............................. 375/326

FOREIGN PATENT DOCUMENTS

| JP | 61-129924 A | 6/1986 |
|----|-------------|--------|
| JP | 2002-048883 A | 2/2002 |
| JP | 2002-162482 A | 6/2002 |
| JP | 2002-218338 A | 8/2002 |

* cited by examiner

*Primary Examiner*—Mohammad H Ghayour
*Assistant Examiner*—Leila Malek
(74) *Attorney, Agent, or Firm*—Frishauf, Holtz, Goodman & Chick, P.C.

(57) ABSTRACT

A circuit for canceling noise components is provided for a radio wave receiver which receives a long wave standard radio wave. The circuit includes a multiplier, a divider, a differentiation circuit and an adder, and obtains a signal by shifting the phase of a carrier signal by 90 degrees, wherein the carrier signal has the same frequency and the same phase as those of the carrier of a received signal outputted from a carrier reproduction circuit. Thereby, it is possible to certainly remove the noises in the vicinity of a received frequency.

10 Claims, 9 Drawing Sheets

RADIO WAVE RECEIVER, RADIO WAVE RECEPTION INTEGRATED CIRCUIT, WAVE CLOCK, AND REPEATER

CROSS-REFERENCE TO RELATED APPLICATIONS

This application is based upon and claims the benefit of priority from the prior Japanese Patent Application No. 2003-381021, filed on Nov. 11, 2003, and the entire contents of which are incorporated herein by reference.

BACKGROUND OF THE INVENTION

1. Field of the Invention

The present invention relates to a radio wave receiver, a radio wave reception integrated circuit, a wave clock, and a repeater.

2. Description of Related Art

A standard radio wave including time data, that is, a time code is sent in each country (for example, Germany, England, Switzerland, Japan or the like). In our country (Japan), long wave standard radio waves the amplitudes of which are modulated by the time code of the standard time format, and the frequencies of which are 40 kHz and 60 kHz respectively, are sent from two transmitting stations (Fukushima and Saga). This time code is sent by the frame the cycle of which is 60 seconds, for every occasion when the place of minute of the exact time is updated, that is, for every 1 minute.

In late years, a so-called wave clock for receiving a standard radio wave including such the time code to correct the current time data by the standard radio wave has been put to practical use. The wave clock receives the standard radio wave via a built-in antenna for every predetermined time. Further, the wave clock amplifies and modulates the received standard radio wave and decodes the time code. Thereby, the wave clock corrects the current time.

Incidentally, the received signal that the wave clock actually receives is the standard radio wave sent from a transmitting station, to which various kinds of signals are mixed and superposed as noises in transmission process from the transmitting station to the wave clock. For this reason, there is possibility for misjudging the time data because of the noises included in the received signal.

Consequently, the method for removing noises from a received signal by using a filter such as a band pass filter, a low pass filter or the like is generally considered. However, a filter has a certain pass band, so that there has been the problem that a filter also allows passage of noise components in the vicinity of the received frequency (frequency of the standard radio wave) which essentially wants to pass the filter.

SUMMARY OF THE INVENTION

Therefore, in the present invention, the removal of noise itself in the vicinity of a received frequency is removed surely by constituting a circuit so as to counteract noise components by using a multiplier, a divider, a differentiation circuit, and an adder in a detection circuit that a radio wave receiver for receiving a long wave standard radio wave comprises.

PREFERRED EMBODIMENTS OF THE INVENTION

Hereinafter, the best mode for implementing the present invention will be described with reference to the drawings. Incidentally, in the followings, the case where the present invention is applied to a wave clock for receiving a long wave standard radio wave to correct time is described. However, the application of the present invention is not limited to this case.

First Embodiment

First, a first embodiment will be described.

Figure 1:
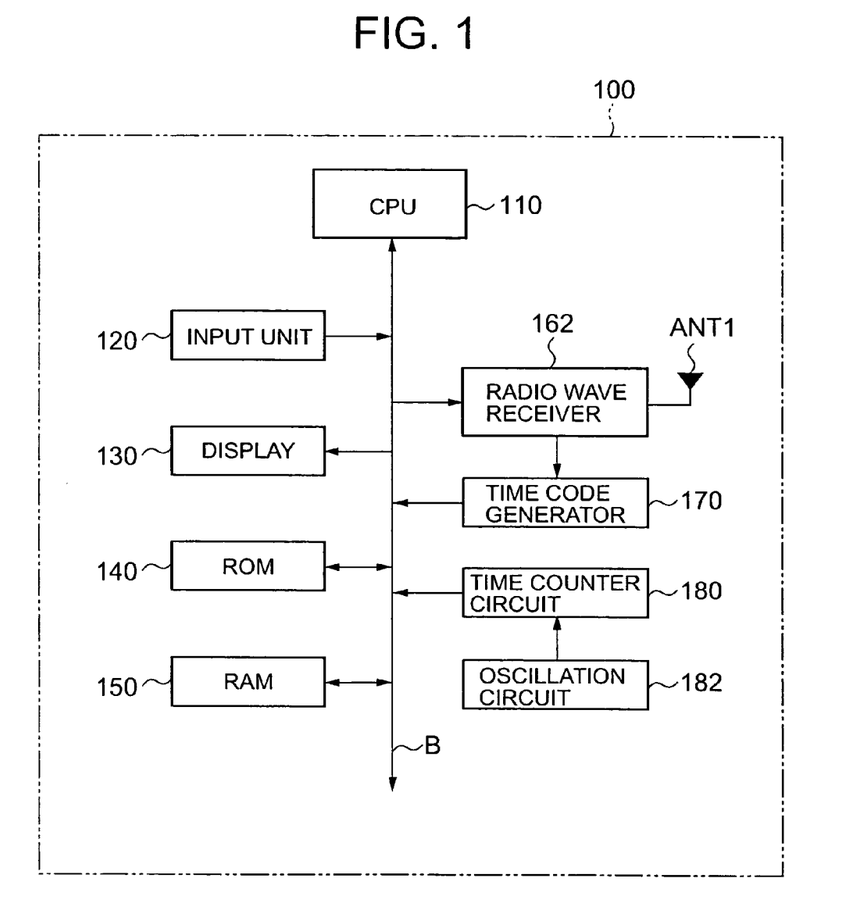
FIG. 1 is a block diagram showing an inside construction of a wave clock to which the present invention is applied.

FIG. 1 is a block diagram showing an inside construction of a wave clock 100 in the first embodiment. According to FIG. 1, the wave clock 100 comprises a CPU (Central Processing Unit) 110, an input unit 120, a display 130, a ROM (Read Only Memory) 140, a RAM (Random Access Memory) 150, a radio wave receiver 162, a time code generator 170, a time counter circuit 180, and an oscillation circuit 182. Further, each part other than the oscillation circuit 182 is connected by a bus B, and the oscillation circuit 182 is connected to the time counter circuit 180.

The CPU 110 reads the program stored in the ROM 140 according to a predetermined timing or an operation signal inputted by the input unit 120 to develop it into the RAM 150. Further, the CPU 110 performs instructions, data transfer or the like to each part of the wave clock 100 based on the program. To put it concretely, the CPU 110 controls the radio wave receiver 162 for every predetermined time to perform reception processing of a standard radio wave, and corrects current time data counted by the time counter circuit 180 based on the standard time code inputted by the time code generator 170.

The input unit 120 comprises switches and the like for performing various functions of the wave clock 100, and outputs operation signals corresponding to the switches to the CPU 110 when the switches are operated. The display 130 comprises a small liquid crystal display and the like, and performs digital display of current time based on the display signal inputted from the CPU 110.

The ROM 140 stores a system program and an application program related to the wave clock 100, a program and data for realizing the present embodiment, and the like. The RAM 150 is used as the working area of the CPU 110, and temporarily stores the program read from the ROM 140, the data processed by the CPU 110, and the like.

The radio wave receiver 162 cuts unnecessary frequency components of the long wave standard radio wave received by the receiving antenna ANT1 to take the frequency signal.

Further, the radio wave receiver 162 converts the frequency signal into a corresponding electrical signal to output to the time code generator 170.

The time code generator 170 converts the signal inputted from the radio wave receiver 162 into a digital signal. Further, the time code generator 170 generates a standard time code comprising the data necessary for clock functions such as a standard time (clock time) code, a multiplication cord, a day of the week code or the like, and outputs the standard time code to the CPU 110.

The time counter circuit 180 counts the signal inputted from the oscillation circuit 182 to count the current time, and outputs the current time data to the CPU 110. The oscillation circuit 182 is the circuit for always outputting a clock signal having a constant frequency.

Figure 2:
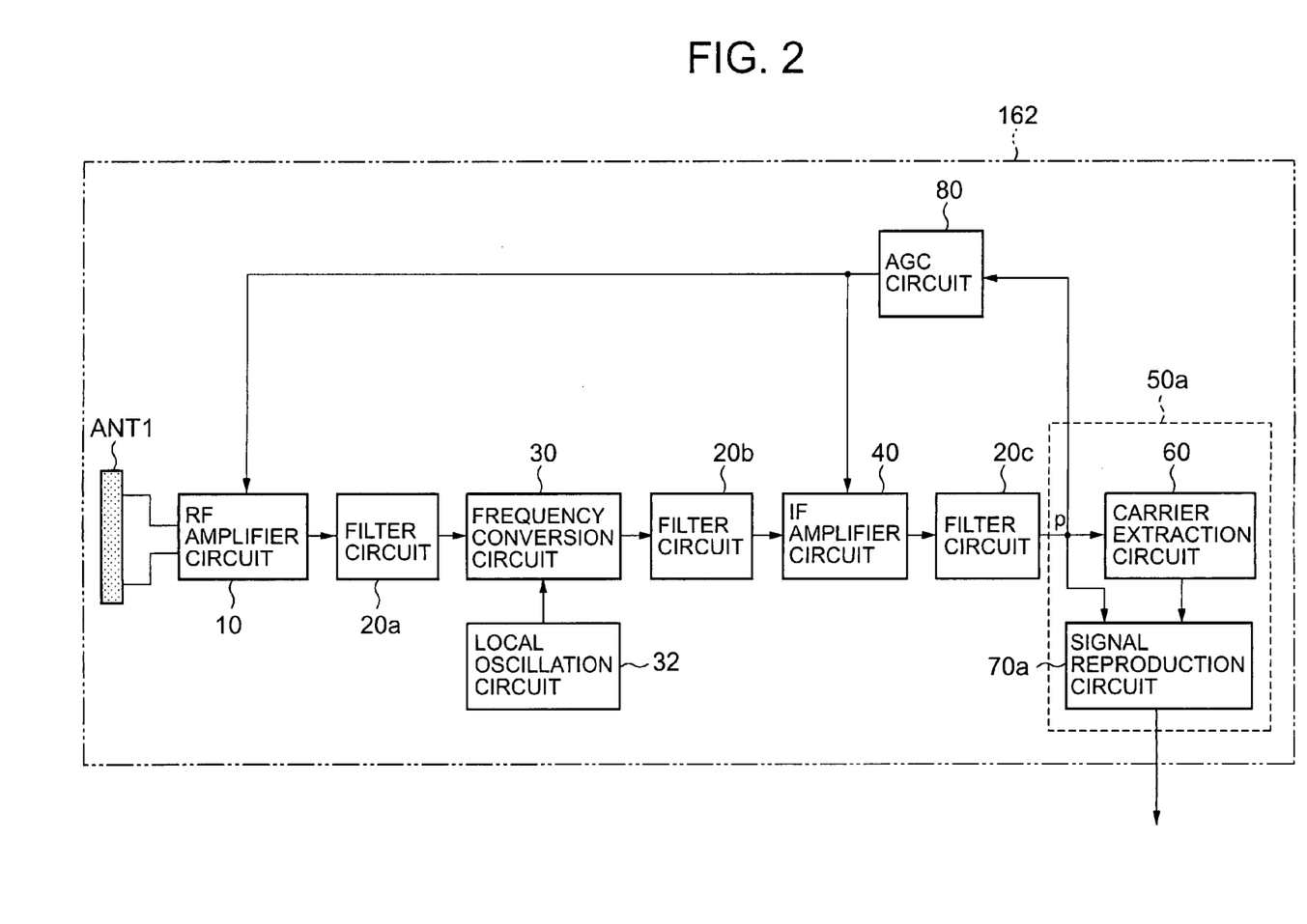
FIG. 2 is a block diagram showing a circuit construction of a radio wave receiver.

FIG. 2 is a block diagram showing a circuit construction of the radio wave receiver 162 of the super-heterodyne system in the present embodiment. According to FIG. 2, the radio wave receiver 162 comprises an integrated circuit comprising a reception antenna ANT1, a RF amplifier circuit 10, a filter circuits 20a, 20b and 20c, a frequency conversion circuit 30, a local oscillation circuit 32, an IF amplifier circuit 40, an AGC (Auto Gain Control) circuit 80, and a detection circuit 50a.

The reception antenna ANT1 can receive a long wave standard radio wave having a predetermined frequency including a time (clock time) code, and comprises, for example, a bar antenna. The long wave standard radio wave received by the reception antenna ANT1 is converted into an electric signal, and outputted.

The RF amplifier circuit 10 amplifies or damps the signal inputted from the reception antenna ANT1, by the amplification degree corresponding to a control signal inputted from the AGC circuit 80, and outputs it.

The filter circuit 20a comprises a band pass filter and the like. The filter circuit 20a outputs the signal inputted from the RF amplifier circuit 10, while allowing the passage of frequency components thereof within a predetermined range, and blocking frequency components outside of the predetermined range.

The frequency conversion circuit 30 synthesizes the signal inputted from a filter circuit 20a and the local oscillation signal inputted from the local oscillation circuit 32. The frequency conversion circuit 30 converts the synthesized signal into the signal having an intermediate frequency (an intermediate frequency signal), and outputs it.

The filter circuit 20b comprises a band pass filter and the like. The filter circuit 20b outputs the signal inputted from the frequency conversion circuit 30, while allowing the passage of frequency components thereof within a predetermined range the center of which is the intermediate frequency, and blocking frequency components outside of the predetermined range.

The IF amplifier circuit 40 amplifies or damps the signal inputted from the filter circuit 20b according to a control signal inputted from the AGC circuit 80, and outputs it.

The filter circuit 20c comprises a band pass filter and the like. The filter circuit 20c outputs the signal inputted from the IF amplifier circuit 40, while allowing the passage of frequency components thereof within a predetermined range, and blocking frequency components outside of the predetermined range.

The detection circuit 50a detects the signal p inputted from the filter circuit 20c to output a detection signal. The detection signal outputted from the detection circuit 50a is outputted to the time code generator 170, and the standard time code is generated. The generated standard time code is inputted into the CPU 110, and used for various processing such as the correction of the current time data.

The AGC circuit 80 outputs a control signal for adjusting the amplification degree of the RF amplifier circuit 10 and the IF amplifier circuit 40 according to the strength of the signal p inputted from the filter circuit 20c.

Figure 3:
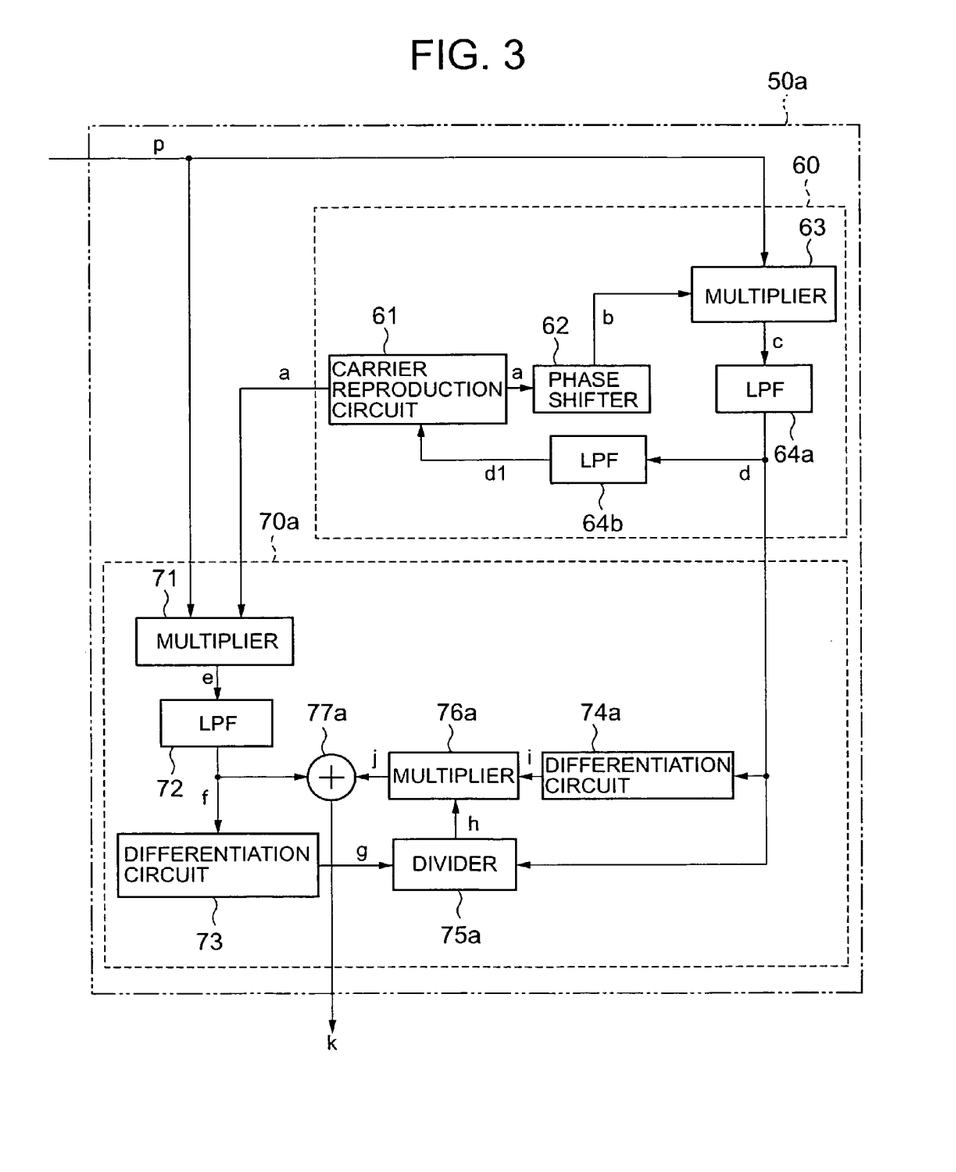
FIG. 3 is a block diagram showing a circuit construction of a detection circuit in a first embodiment.

FIG. 3 is a block diagram showing a circuit construction of the detection circuit 50a. According to FIG. 3, the detection circuit 50a comprises a carrier extraction circuit 60 and a signal reproduction circuit 70a. The carrier extraction circuit 60 comprises a carrier reproduction circuit 61, a phase shifter 62, a multiplier 63 and LPFs 64a and 64b. The signal reproduction circuit 70a comprises multipliers 71 and 76a, a LPF 72, differentiation circuits 73 and 74a, a divider 75a, and an adder 77a.

The carrier reproduction circuit 61 comprises a PLL circuit and the like. The carrier reproduction circuit 61 generates a carrier reproduction signal having the same frequency and the same phase as those of a carrier of the received signal (a carrier wave), and outputs it as a signal a. The phase shifter 62 shifts the phase of the signal a inputted from the carrier reproduction circuit 61 so as to advance the phase by 90 degrees, and outputs it as a signal b. Hereupon, the phase shift means advancing a phase or delaying a phase. The multiplier 63 multiplies the signal p inputted from the filter circuit 20c by the signal b inputted from the phase shifter 62, and outputs the multiplied signal as a signal c.

The LPF 64a allows the passage of frequency components of the signal c inputted from the multiplier 63 within a predetermined low range, and blocks frequency components outside of the predetermined range to output the signal as a signal d. The LPF 64b allows the passage of frequency components of the signal d inputted from the LPF 64a within a predetermined low range, and blocks frequency components outside of the predetermined range to output the signal as a signal d1.

The multiplier 71 multiplies the signal p inputted from the filter circuit 20c by the signal a inputted from the carrier reproduction circuit 61, and outputs the multiplied signal as a signal e. The LPF 72 allows the passage of frequency components of the signal e inputted from the multiplier 71 within a predetermined low range, and blocks frequency components outside of the predetermined range to output the signal as a signal f. The differentiation circuit 73 differentiates the signal f inputted from the LPF 72 with respect to time, and outputs the differentiated signal as a signal g.

The differentiation circuit 74a differentiates the signal d inputted from the LPF 64a with respect to time, and outputs the differentiated signal as a signal i. The divider 75a divides the signal d inputted from the LPF 64a by the signal g inputted from the differentiation circuit 73, and outputs the divided signal as a signal h. The multiplier 76a multiplies the signal i inputted from the differentiation circuit 74a by the signal h inputted from the divider 75a, and outputs the multiplied signal as a signal j.

The adder 77a adds the signal f inputted from the LPF 72 and the signal j inputted from the multiplier 76a, and outputs the added signal as a signal k. The signal k is the detection signal which is the output signal from the detection circuit 50a.

Next, the operation of each circuit that the detection circuit 50a comprises will be described by using a theoretical formula of each signal.

The signal p inputted from the filter circuit 20c comprises a reception-intended signal (signal having the frequency intended for the reception essentially) and a noise. The frequency of the reception-intended signal is defined as $\omega$, and the signal wave thereof is defined as "A sin ωt". Hereupon, the amplitude A is a time function. However, the reception-intended signal is a long wave standard radio wave, so that it changes in an extremely long period. In addition, the modulation degree is any of 10% and 100%. Consequently, the amplitude A can be approximately considered to be the fixed number. Therefore, it is possible to represent the signal p by the synthesis of the amplitude component A of the reception-intended signal and the amplitude component B of the noise, as shown in the following formula (1).

$$p = A\sin\omega t + B[\sin\{(\omega+\Delta\omega)t+\phi\} + \cos\{(\omega+\Delta\omega)t+\phi\}] \quad (1)$$

Hereupon, Δω is the difference with the frequency of the reception-intended signal, and φ is the phase difference with the reception-intended signal.

First, the extraction of a carrier signal in the carrier extraction circuit 60 will be described.

In the carrier extraction circuit 60, when the signal a (carrier reproduction signal) outputted from the carrier extraction circuit 60 is set to "sin(ωt+δ)", the phase shifter 62 outputs the signal b obtained by advancing the phase of the signal a by 90 degrees, so that the signal b is "cos(ωt+δ)". The noise component is now omitted in order to simplify the description. The multiplier 63 multiplies the signal b by the signal p, and outputs the multiplied signal as the signal c. Therefore, the signal c is given by the following formula (2).

$$c = A\sin\omega t \cdot \cos(\omega t + \delta) \quad (2)$$
$$= \frac{A}{2}\{\sin2\omega t \cdot \cos\delta - (1 - \cos2\omega t) \cdot \sin\delta\}$$

Further, as for the signal c, the high frequency component thereof is blocked by the passage through the LPF 64a, and only the component given by the following formula (3) is outputted as the signal d.

$$d = \frac{A}{2}\sin\delta \quad (3)$$

The signal d generally changes slowly, so that it becomes the signal d1 the noise components of which are sufficiently removed, by the passage through the LPF 64b. Further, the signal d1 is fed back (returned) to the carrier reproduction circuit 61, and the phase correction is carried out. Consequently, the phase shift for δ of the signal a is corrected, and the signal converges to "sin ωt" and becomes the carrier signal having the same frequency and the same phase as those of the received signal. Further, the signal b becomes "cos ωt".

Next, the generation of the detection signal in the detection circuit 50a will be described.

In the carrier extraction circuit 60, the multiplier 63 multiplies the signal p by the signal b, and outputs the multiplied signal as the signal c. Therefore, the signal c is given by the following formula (4).

$$c = p \cdot b \quad (4)$$
$$= \{A\sin\omega t + B[\sin\{(\omega + \Delta\omega)t + \phi\} + \cos\{(\omega + \Delta\omega)t + \phi\}]\} \cdot \cos\omega t$$
$$= \frac{A}{2}\sin2\omega t + \frac{B}{2}[\sin2\omega t \cdot \cos(\Delta\omega t + \phi) +$$
$$(1 + \cos2\omega t) \cdot \sin(\Delta\omega t + \phi) + (1 + \cos2\omega t) \cdot$$
$$\cos(\Delta\omega t + \phi) - \sin2\omega t \cdot \sin(\Delta\omega t + \phi)]$$

Further, as for the signal c, the high frequency component thereof is blocked by the passage through the LPF 64a, and only the component given by the following formula (5) is outputted as the signal d.

$$d = \frac{B}{2}\{\sin(\Delta\omega t + \phi) + \cos(\Delta\omega t + \phi)\} \quad (5)$$

In the signal reproduction circuit, the multiplier 71 multiplies the signal p by the signal a, and outputs the multiplied signal as the signal e. Therefore, the signal e is given by the following formula (6).

$$e = p \cdot a \quad (6)$$
$$= \{A\sin\omega t + B[\sin\{(\omega + \Delta\omega)t + \phi\} + \cos\{(\omega + \Delta\omega)t + \phi\}]\} \cdot \sin\omega t$$
$$= \frac{A}{2}(1 - \cos2\omega t) + \frac{B}{2}[(1 - \cos2\omega t) \cdot \cos(\Delta\omega t + \phi) +$$
$$\sin2\omega t \cdot \sin(\Delta\omega t + \phi) + \sin2\omega t \cdot \cos(\Delta\omega t + \phi) -$$
$$(1 - \cos2\omega t) \cdot \sin(\Delta\omega t + \phi)]$$

As for the signal e, the high frequency component is blocked by the passage through the LPF 72, and only the component given by the following formula (7) is outputted as the signal f.

$$f = \frac{A}{2} + \frac{B}{2}\{\cos(\Delta\omega t + \phi) - \sin(\Delta\omega t + \phi)\} \quad (7)$$

Further, the differentiation circuit 73 differentiates the signal f, and outputs the differentiated signal as the signal g. Therefore, the signal g is given by the following formula (8).

$$g = \frac{d}{dt}f \quad (8)$$
$$= -\Delta\omega \cdot \frac{B}{2}\{\sin(\Delta\omega t + \phi) + \cos(\Delta\omega t + \phi)\}$$

On the other hand, the differentiation circuit 74a differentiates the signal d, and outputs the differentiated signal as the signal i. Therefore, the signal i is given by the following formula (9).

$$i = \frac{d}{dt}d \quad (9)$$
$$= \Delta\omega \cdot \frac{B}{2}\{-\sin(\Delta\omega t + \phi) + \cos(\Delta\omega t + \phi)\}$$

Further, the divider 75a divides the signal d by the signal g, and outputs the divided signal as the signal h. Therefore, the signal h is given by the following formula (10).

$$h = d/g \qquad (10)$$
$$= -\frac{1}{\Delta\omega}$$

The multiplier 76a multiplies the signal h by the signal i, and outputs the multiplied signal as the signal j. Therefore, the signal j is given by the following formula (11).

$$j = h \times i \qquad (11)$$
$$= \frac{B}{2}\{\sin(\Delta\omega t + \phi) - \cos(\Delta\omega t + \phi)\}$$

After that, the adder 77a adds the signal f and the signal j, and outputs the added signal as the signal k. Therefore, the signal k which is the detection signal is given by the following formula (12).

$$k = f + j \qquad (12)$$
$$= \frac{A}{2}$$

That is, a signal having the amplitude only of the reception-intended signal is outputted from the detection circuit 50a. Hereupon, as for the long wave standard radio wave, the data included in the radio wave is determined on a binary amplitude and a binary pulse width. Therefore, even when the amplitude of the signal k is one-half of the amplitude A of the reception-intended signal, the signal k can be detected as the signal having one-half of the amplitude, so that there is no special problem.

As above, in the first embodiment, in the detection circuit 50a that the wave clock 100 for receiving the long wave standard radio wave including the time data comprises, the detection is carried out as follows. First, the signal obtained by multiplying the signal b obtained by advancing the phase of the carrier signal (signal a) generated by the carrier reproduction circuit 61 by 90 degrees, by the signal p inputted to the detection circuit 50a, is outputted as the signal d, via the LPF 64a. Further, the signal e obtained by multiplying the signal p by the signal a is outputted as the signal f, via the LPF 72. Then, the signal d is divided by the signal obtained by differentiating the signal f. Further, the signal j obtained by multiplying the signal h obtained by the division, by the signal i obtained by differentiating the signal d, is outputted. After that, the signal k obtained by adding the signal f and the signal j is outputted as the detection signal. That is, the phase of the carrier signal (signal a) is advanced by 90 degrees and a synchronous detection and appropriate processing are carried out, so that noise components are cancelled. Therefore, it is possible to certainly remove the noises in the vicinity of the received frequency, which has not been removed completely by filters, in the past.

Second Embodiment

Next, the second embodiment will be described.

In the above-described first embodiment, the signal k outputted as the detection signal is represented by the following formula (13a).

$$k = f + d \Big/ \left(\frac{d}{dt}\right) f * \left(\frac{d}{dt}\right) d \qquad (13a)$$

Figure 4:
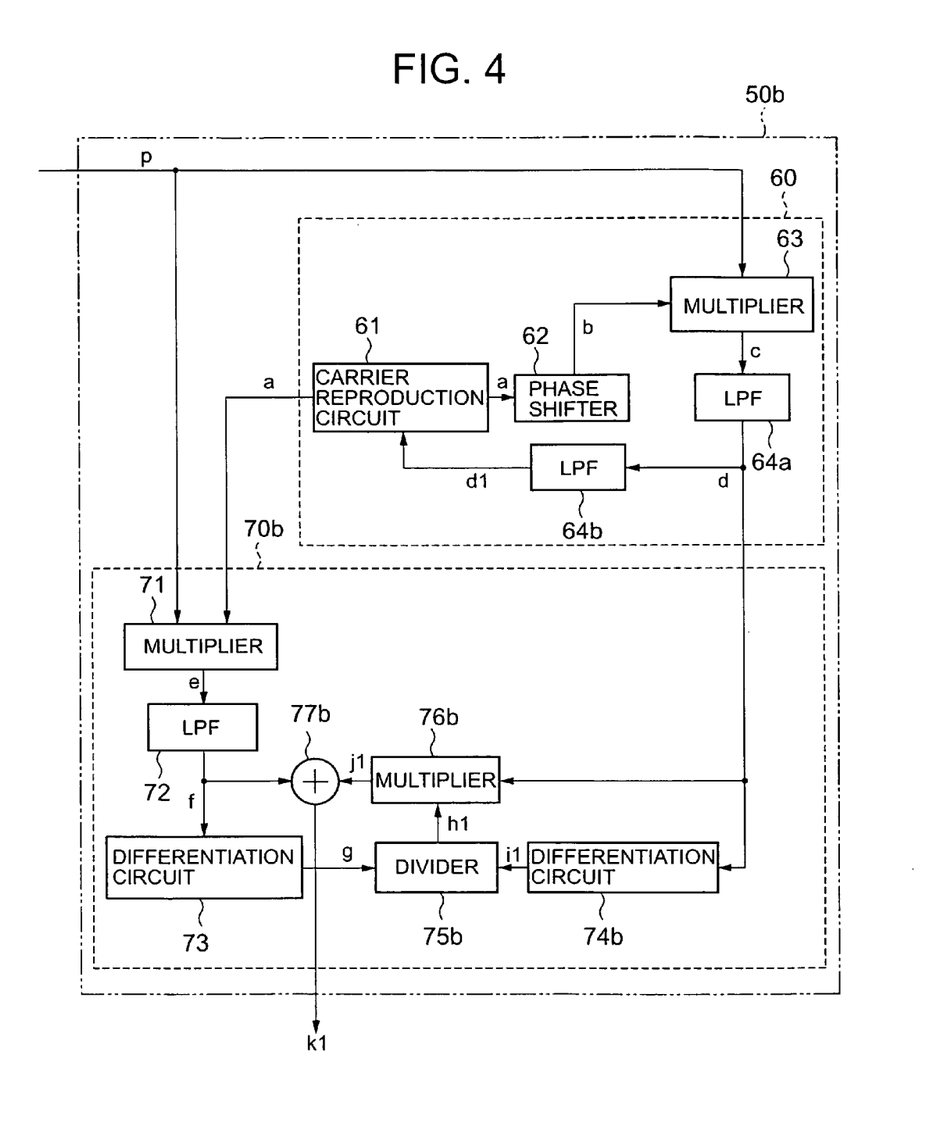
FIG. 4 is a block diagram showing a circuit construction of a detection circuit in a second embodiment.

In the second embodiment, the detection circuit which meets the following formula (13b) obtained by deforming the above formula (13a) is constructed.

$$k = f + d * \left\{\left(\frac{d}{dt}\right)d \Big/ \left(\frac{d}{dt}\right)f\right\} \qquad (13b)$$

That is, the second embodiment is the embodiment where the above-described detection circuit 50a (refer to FIG. 3) in the first embodiment is replaced by a detection circuit 50b shown in FIG. 4. In the followings, by applying the same reference numbers to the same elements as those of the above-described first embodiment, detail descriptions thereof will be omitted.

FIG. 4 is a block diagram showing a circuit construction of the detection circuit 50b in the second embodiment. According to FIG. 4, the detection circuit 50b comprises a carrier extraction circuit 60, and a signal reproduction circuit 70b. The signal reproduction circuit 70b comprises multipliers 71 and 76b, a LPF72, differentiation circuits 73 and 74b, a divider 75b, and adder 77b.

The differentiation circuit 74b differentiates the signal d inputted from the LPF 64a with respect to time, and outputs the differentiated signal as a signal i1. The divider 75b divides the signal i1 inputted from the differentiation circuit 74b by the signal g inputted from the differentiation circuit 73, and outputs the divided signal as a signal h1. The multiplier 76b multiplies the signal d inputted from the LPF 64a by the signal h1 inputted from the divider 75b, and outputs the multiplied signal as a signal j1.

Further, the adder 77b adds the signal f inputted from the LPF 72 and the signal j1 inputted from the multiplier 76b, and outputs the added signal as a signal k1. The signal k1 is the detection signal which is the output signal from the detection circuit 50b.

Next, the operation of each circuit that the detection circuit 50b comprises will be described by using a theoretical formula of each signal. Incidentally, as for the signals a to g, the descriptions thereof will be omitted in the followings, because they are the same as the first embodiment.

The differentiation circuit 74b differentiates the signal d given by the formula (5), and outputs the differentiated signal as the signal i1. Therefore, the signal i1 is given by the following formula (14).

$$i1 = \frac{d}{dt}d(=i) \qquad (14)$$
$$= \Delta\omega \cdot \frac{B}{2}\{-\sin(\Delta\omega t + \phi) + \cos(\Delta\omega t + \phi)\}$$

The divider 75b divides the signal i1 by the signal g given by the formula (8), and outputs the divided signal as the signal h1. Therefore, the signal h1 is given by the following formula (15).

$$h1 = i1/g \quad (15)$$
$$= \{\sin(\Delta\omega t + \phi) - \cos(\Delta\omega t + \phi)\}/$$
$$\{\sin(\Delta\omega t + \phi) + \cos(\Delta\omega t + \phi)\}$$

The multiplier 76b multiplies the signal d by the signal h1, and outputs the multiplied signal as the signal j1. Therefore, the signal j1 is given by the following formula (16).

$$j1 = d \times h1 \quad (16)$$
$$= \frac{B}{2}\{\sin(\Delta\omega t + \phi) - \cos(\Delta\omega t + \phi)\}$$

After that, the adder 77b adds the signal f given by the formula (7) and the signal j1, and outputs the added signal as the signal k1. Therefore, the signal k1 is given by the following formula (17).

$$k1 = f + j \quad (17)$$
$$= \frac{A}{2}$$

Of course, the signal k1 is equal to the signal k calculated in the first embodiment.

As above, in the second embodiment, the signal g is divided by the signal i1 obtained by differentiating the signal d. Further, the signal j1 obtained by multiplying the signal h1 obtained by the division, by the signal d, is added to the signal f. That is, also in the second embodiment, same as the above-described first embodiment, the phase of the carrier signal is advanced by 90 degrees and a synchronous detection and appropriate processing are carried out, so that noise components are cancelled. Therefore, it is possible to certainly remove the noises in the vicinity of the received frequency, which has not been removed completely by filters, in the past.

Third Embodiment

Next, the third embodiment will be described.

In the third embodiment, a detection circuit comprises phase shift circuits 78 and 79, instead of the differentiation circuits 73 and 74a in the detection circuit 50a of the first embodiment. That is, the third embodiment is the embodiment where the detection circuit 50a (refer to FIG. 3) of the above-described first embodiment is replaced by a detection circuit 50c shown in FIG. 5. In the followings, by applying the same reference numbers to the same elements as those of the above-described first and second embodiments, detail descriptions thereof will be omitted.

Figure 5:
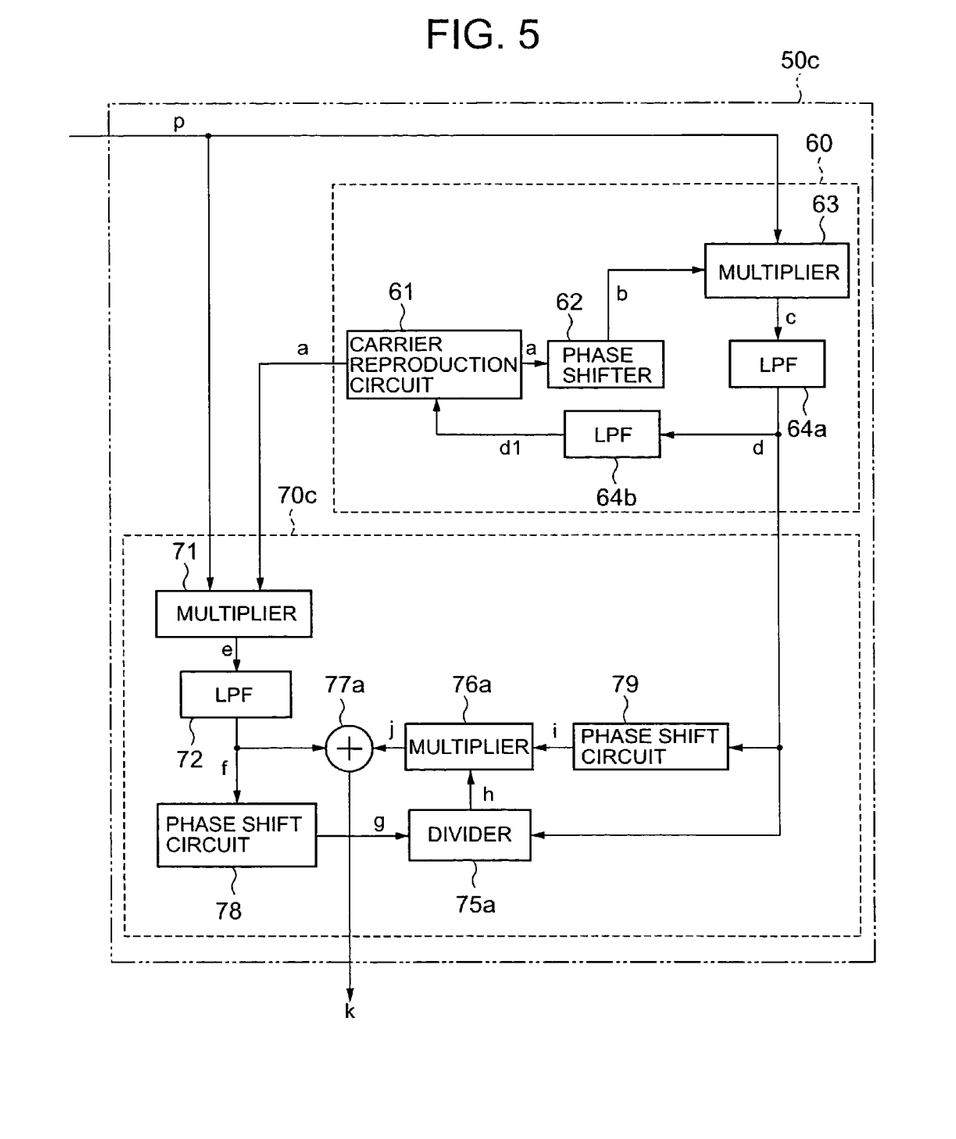
FIG. 5 is a block diagram showing a circuit construction of a detection circuit in a third embodiment.

FIG. 5 is a block diagram showing a circuit construction of the detection circuit 50c in the third embodiment. According to FIG. 5, the detection circuit 50c comprises a carrier extraction circuit 60 and a signal reproduction circuit 70c. The signal reproduction circuit 70c comprises a multiplier 71, a LPF 72, phase shift circuits 78 and 79, a divider 75a, a multiplier 76a, and an adder 77a.

The phase shift circuit 78 shifts the phase of the signal f inputted from the LPF 72 by 90 degrees, and outputs it as the signal g. The phase shift circuit 79 shifts the phase of the signal d inputted from the LPF 64a by 90 degrees, and outputs it as the signal i.

As above, in the third embodiment, the differentiation circuits 73 and 74a in the first embodiment are replaced by the phase shift circuit 78 for advancing (shifting) the phase of the signal f by, for example, 90 degrees and the phase shift circuit 79 for advancing the phase of the signal d by 90 degrees respectively. Same as the above-described first and second embodiments, the phase of the carrier signal (signal a) is advanced by 90 degrees and a synchronous detection and appropriate processing are carried out, so that noise components are cancelled. Therefore, it is possible to certainly remove the noises in the vicinity of the received frequency, which has not been removed completely by filters, in the past.

Incidentally, in the third embodiment, the case where the differentiation circuits 73 and 74a in the detection circuit 50a (refer to FIG. 3) of the first embodiment are replaced by the phase shift circuits is described. However, of course, the differentiation circuits 73 and 74a in the detection circuit 50b (refer to FIG. 4) of the second embodiment may be replaced by the phase shift circuits.

Incidentally, the application of the present invention is not limited to the above-described three embodiments, and can be changed without departing from the scope of the present invention.

(Modification 1) Placing LPF at Final Stage of Detection Circuit

Figure 6:
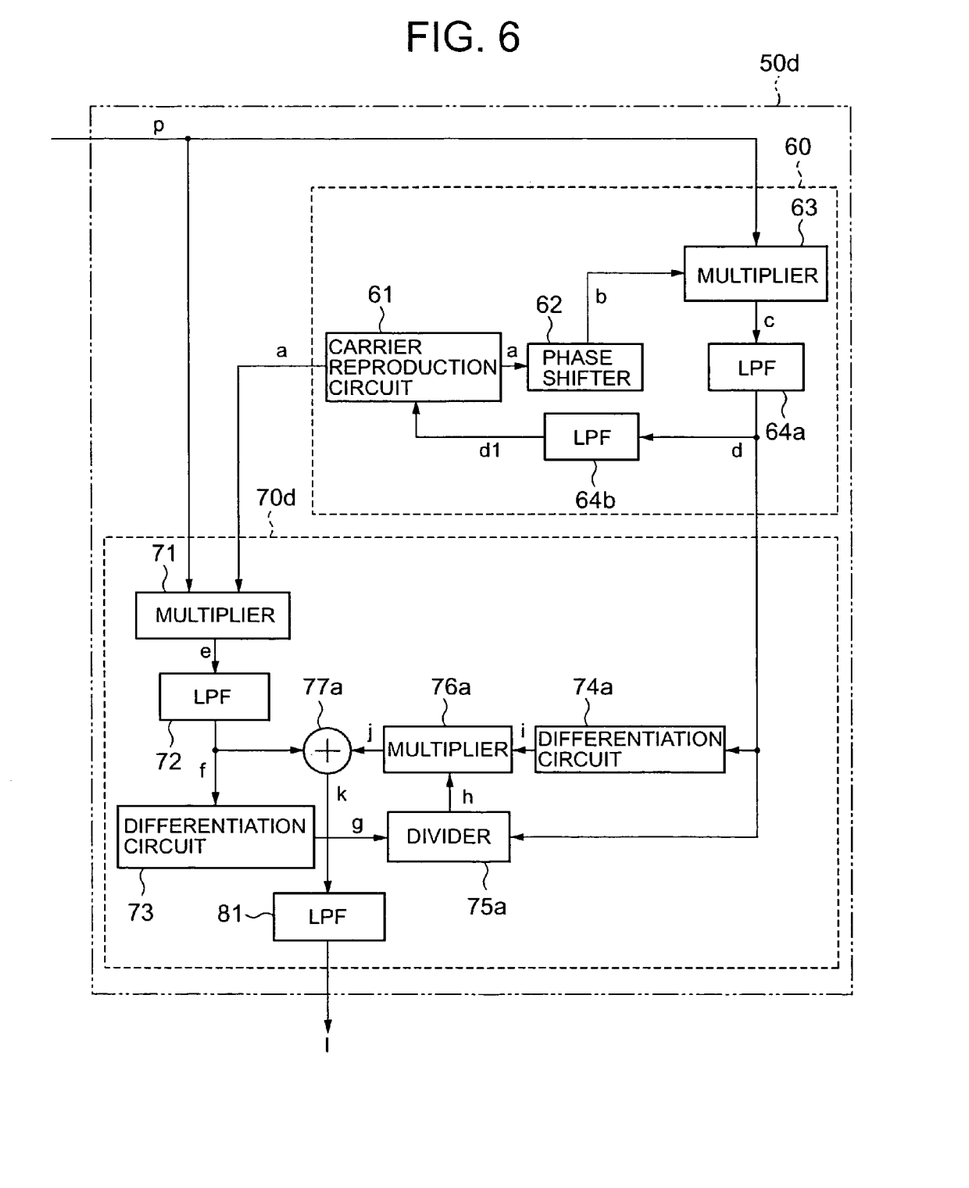
FIG. 6 is a block diagram showing a circuit construction of a detection circuit in a modification 1.

In each of the above-described embodiments, a LPF may be placed at the final stage of the detection circuits 50a, 50b and 50c, or the final stage of the signal reproduction circuits 70a, 70b and 70c, that is, at the post stage of the adders 77a and 77b. FIG. 6 shows the case where a LPF 81 is placed at the final stage of the signal reproduction circuit 70d of the first embodiment. In this case, the signal 1 obtained by allowing the passage of frequency component of the signal k outputted from the adder 77a within a predetermined low range and by blocking frequency components outside of the predetermined range, by the LPF 81, is outputted from the signal reproduction circuit 70d, and outputted from the detection circuit 50a, as the detection signal.

(Modification 2) Response to Case where Signal p does not Include Noise Components In the case where the signal p to be inputted to the detection circuits 50a, 50b and 50c does not include noise components or includes sufficiently small noise components, the magnitude of the signal g given by the formula (8) becomes zero or extremely small. Therefore, the magnitude of the signal the signal h given by the formula (10) becomes infinite or extremely large. Consequently, the magnitude of the detection signal outputted from the detection circuit is sometimes extremely large. Therefore, in order to avoid such inconvenience, the detection circuit may be made up as shown in FIG. 7.

Figure 7:
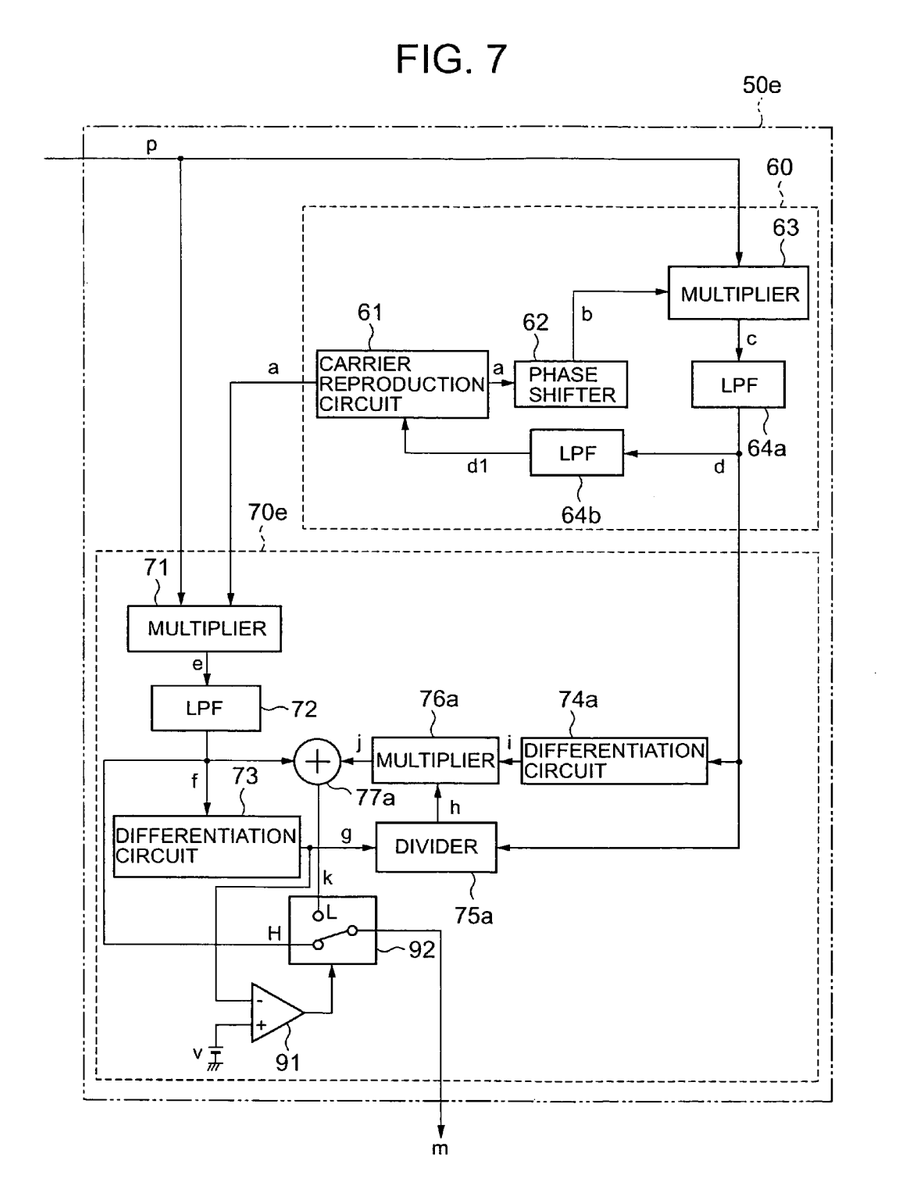
FIG. 7 is a block diagram showing a circuit construction of a detection circuit in a modification 2.

FIG. 7 shows the case where a comparator 91 and a switch circuit 92 are placed in the detection circuit 50a of the first embodiment, as the modification 2. The comparator 91 compares the level of the signal g inputted from the differentiation circuit 73 with predetermined voltage V, and outputs a L signal or a H signal according to the magnitude of the level of the signal g. That is, for example, the comparator 91 outputs the H signal in the case where the level of the signal g is smaller than the predetermined voltage V, and outputs the L signal in the case other than the above.

The switch circuit 92 switches between the signal k inputted from the adder 77a and the signal f inputted from the LPF 72 to output them. That is, for example, the switch circuit 92 switches the signals so as to output the signal k in the case where the L signal is inputted from the comparator 91, and switches the signals so as to output the signal f in the case where the H signal is inputted. Thereby, the switch circuit 92 outputs the switched signal as a signal m.

Therefore, in the case where the level of the signal g is smaller than the predetermined voltage V, the signal f which is the signal of the synchronous detection is outputted from the detection circuit 70e as the detection signal. Further, in the case where the level of the signal g is larger than the predetermined voltage V, the signal k outputted from the adder 77a is outputted as the detection signal.

Incidentally, each of circuits that the detection circuit of each of the above-described embodiments comprises may be an analog circuit or a digital circuit. Further, each of the signals may be designed as a digital signal, the detection circuit may comprises a CPU, a DSP and the like, and accordingly, the functions of each of construction circuits may be realized by a software. Still further, the combination of the above may be available.

(Modification 3) Using Straight System for Radio Wave Receiver 162

In each of the above-described embodiments, the superheterodyne system is used for the radio wave receiver 162. However, a straight system may be used.

Figure 8:
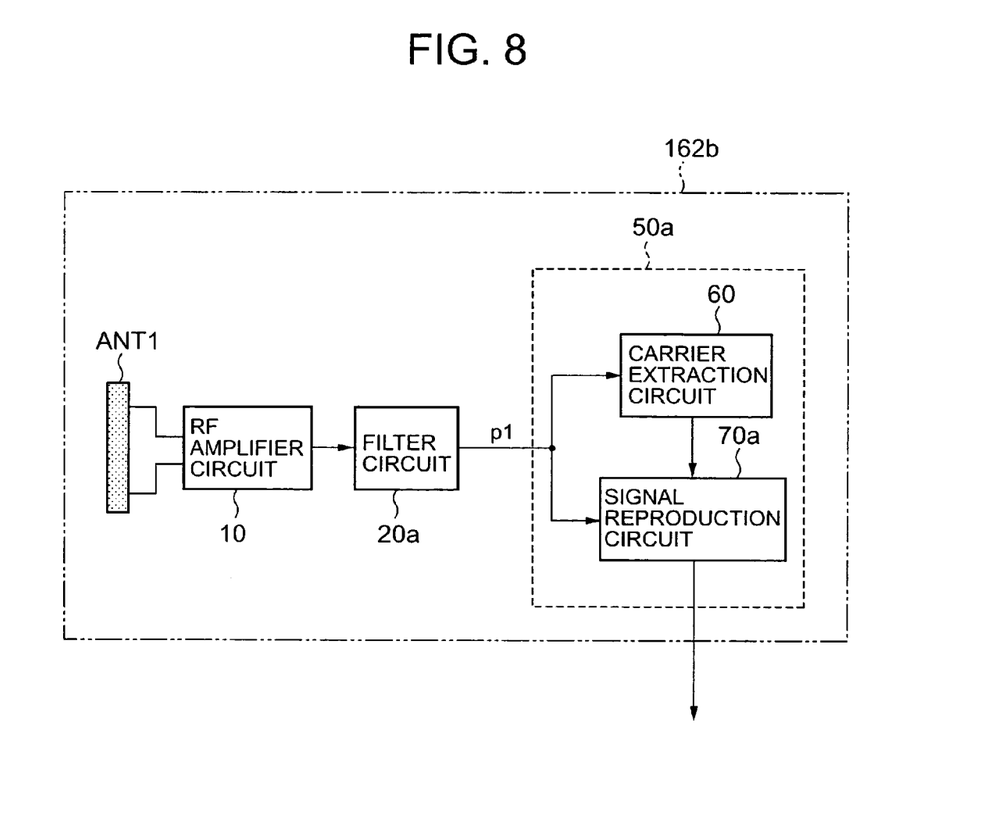
FIG. 8 is a block diagram showing a circuit construction of a radio wave receiver of a straight system.

FIG. 8 is a diagram showing a circuit construction of a radio wave receiver 162b of the straight system. Incidentally, in FIG. 8, the same elements as those of the radio wave receiver 162 (refer to FIG. 2) of the above-described superheterodyne system are provided with the same reference numbers respectively. According to FIG. 8, the radio wave receiver 162b comprises a receiving antenna ANT1, a RF amplifier circuit 10, a filter circuit 20a, and a detection circuit 50a. In this case, a signal p1 outputted from the filter circuit 20a is inputted to the detection circuit 50a.

(Modification 4) Applying Present Invention to Repeater

In addition, in each of the above-described embodiments, the case where the present invention is applied to the wave clock is described. However, the present invention may be applied to a repeater. The repeater is the device which is placed, for example, by the window of a steel framed house or the like where it is difficult for radio waves to penetrate, receives a long wave standard radio wave to obtain accurate time information, and transmits the obtained time information. Further, a wave clock placed in a room receives the time information transmitted from the repeater to perform time correction.

Figure 9:
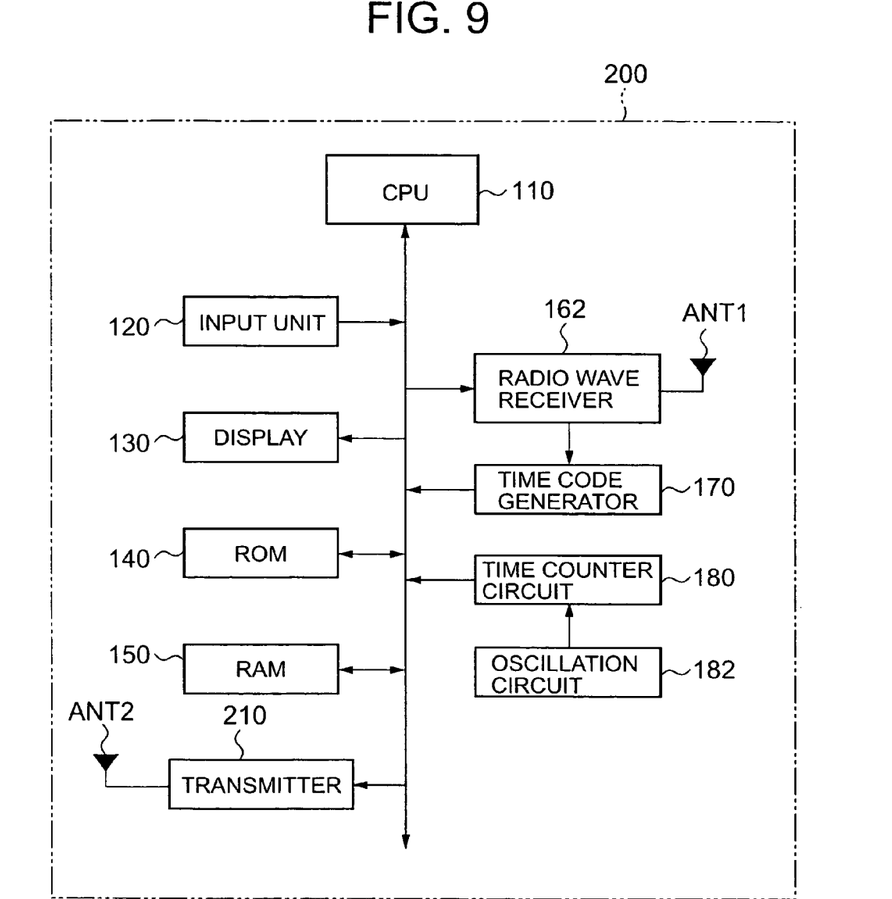
FIG. 9 is a block diagram showing an inside construction of a repeater to which the present invention is applied.

FIG. 9 is a block diagram showing inside construction of a repeater 200 to which the present invention is applied. Incidentally, in FIG. 9, the same elements as those of the above-described wave clock 100 (refer to FIG. 1) are provided with the same reference numbers respectively. According to FIG. 9, the repeater 200 comprises an input unit 120, a display 130, a ROM 140, a RAM 150, a radio wave receiver 162, a time code generator 170, a time counter circuit 180, an oscillation circuit 182, and a transmitter 210.

The transmitter 210 generates a relaying time code on the basis of the current time data counted by the time counter circuit 180. Further, the transmitter 210 adds a carrier wave to the relaying time code to make a relaying radio wave, and transmits the relaying radio wave via a transmitting antenna ANT2. The carrier wave may be the same as the long wave standard radio wave to be received, or may be an exclusive radio wave as the relaying radio wave. In the case where the carrier wave is the same as the long wave standard radio wave, the wave clock placed in a room or the like may be a normal wave clock. Further, in the case where the carrier wave is the exclusive radio wave as the relaying radio wave, the section for receiving the radio wave is required for the wave clock.

According to the above invention, the phase of the carrier signal generated from the received signal is shifted by 90 degrees, and the carrier phase shift multiplied signal obtained by multiplying the phase shifted carrier signal by the received signal is outputted. Further, the received signal is multiplied by the carrier signal, and the first phase shift signal obtained by shifting the phase of the multiplied signal by 90 degrees is outputted. In addition, the second phase shift signal is outputted by shifting the phase of the carrier phase shift multiplied signal by 90 degrees. Next, one signal of the carrier phase shift multiplied signal and the second phase shift signal is divided by the first phase shift signal. Further, the signal obtained by the division is multiplied by the other signal, and thereby the signal-to-be-added is outputted. After that, the detection signal is outputted by adding the signal-to-be-added to the multiplied signal. Therefore, the phase of the carrier signal is shifted by 90 degrees and a synchronous detection and appropriate processing are carried out, so that noise components are cancelled. Thereby, it is possible to certainly remove the noises in the vicinity of the received frequency, which has not been removed completely by filters, in the past.

In addition, it is possible to add the multiplied signal and the signal-to-be-added, and output the detection signal by switching between the signal obtained by the addition and the multiplied signal according to the comparison result between the first phase shift signal and the predetermined level. That is, in the case where the received signal does not include noise components, the level of the first phase shift signal obtained by shifting the phase of the received signal by 90 degrees is extremely small. Accordingly, the magnitude of the signal divided by the division section becomes extremely large. Consequently, there is possibility for having the trouble that the magnitude of the outputted detection signal becomes extremely large. However, for example, in the case where the level of the first phase shift signal is equal to or smaller than the predetermined level, the multiplied signal which is the output of the synchronous detection is outputted as the detection signal. Thereby, in the case where the received signal does not comprise noise components, it is possible to avoid the trouble that the magnitude of the outputted detection signal becomes extremely large.

What is claimed is:

1. A radio wave receiver comprising:
a carrier signal reproduction section for generating a carrier reproduction signal from a received signal received by an antenna, wherein the carrier reproduction signal has a same frequency as that of a carrier wave of the received signal, and a phase of the carrier reproduction signal is corrected using a phase correction signal so that the phase of the carrier reproduction signal becomes equal to that of the carrier wave of the received signal;
a carrier phase shift multiplication section for shifting the phase of the carrier reproduction signal generated by the carrier signal reproduction section, by 90 degrees, and for outputting a carrier phase shift multiplied signal by multiplying the phase shifted carrier reproduction signal by the received signal, wherein a high frequency component of the carrier phase shift multiplied signal is blocked;
a phase correction signal generation section for generating the phase correction signal to correct a phase shift between the carrier reproduction signal and the received signal, based on the carrier phase shift multiplied signal outputted from the carrier phase shift multiplication section, and for feeding the phase correction signal to the carrier signal reproduction section;

a multiplication section for outputting a multiplied signal by multiplying the received signal by the carrier reproduction signal, wherein a high frequency component of the multiplied signal is blocked;

a first phase shift section for outputting a first phase shift signal by shifting a phase of the multiplied signal outputted by the multiplication section, by 90 degrees;

a second phase shift section for outputting a second phase shift signal by shifting a phase of the carrier phase shift multiplied signal outputted by the carrier phase shift multiplication section, by 90 degrees;

a signal-to-be-added generation section for dividing one signal of the carrier phase shift multiplied signal outputted by the carrier phase shift multiplication section and the second phase shift signal outputted by the second phase shift section, by the first phase shift signal, and for outputting a signal-to-be-added by multiplying the divided signal by the other signal; and an output section for outputting a detection signal by adding the signal-to-be-added to the multiplied signal.

2. The radio wave receiver of claim 1, wherein the output section comprises a low pass filter, and outputs the detection signal via the low pass filter.

3. A wave clock apparatus comprising:

a carrier signal reproduction section for generating a carrier reproduction signal from a received signal received by an antenna, wherein the carrier reproduction signal has a same frequency as that of a carrier wave of the received signal, and a phase of the carrier reproduction signal is corrected using a phase correction signal so that the phase of the carrier reproduction signal becomes equal to that of the carrier wave of the received signal;

a carrier phase shift multiplication section for shifting the phase of the carrier reproduction signal generated by the carrier signal reproduction section, by 90 degrees, and for outputting a carrier phase shift multiplied signal by multiplying the phase shifted carrier reproduction signal by the received signal, wherein a high frequency component of the carrier phase shift multiplied signal is blocked;

a phase correction signal generation section for generating the phase correction signal to correct a phase shift between the carrier reproduction signal and the received signal, based on the carrier phase shift multiplied signal outputted from the carrier phase shift multiplication section, and for feeding the phase correction signal to the carrier signal reproduction section;

a multiplication section for outputting a multiplied signal by multiplying the received signal by the carrier reproduction signal, wherein a high frequency component of the multiplied signal is blocked;

a first phase shift section for outputting a first phase shift signal by shifting a phase of the multiplied signal outputted by the multiplication section, by 90 degrees;

a second phase shift section for outputting a second phase shift signal by shifting a phase of the carrier phase shift multiplied signal outputted by the carrier phase shift multiplication section, by 90 degrees;

a signal-to-be-added generation section for dividing one signal of the carrier phase shift multiplied signal outputted by the carrier phase shift multiplication section and the second phase shift signal outputted by the second phase shift section, by the first phase shift signal, and for outputting a signal-to-be-added by multiplying the divided signal by the other signal;

an output section for outputting a detection signal by adding the signal-to-be-added to the multiplied signal;

a time code generation section for generating a standard time code based on the detection signal outputted from the output section;

a time count section for counting a current time; and a time correction section for correcting data of the current time counted by the time count section, based on the standard time code generated by the time code generation section.

4. A repeater comprising:

a carrier signal reproduction section for generating a carrier reproduction signal from a received signal received by an antenna, wherein the carrier reproduction signal has a same frequency as that of a carrier wave of the received signal, and a phase of the carrier reproduction signal is corrected using a phase correction signal so that the phase of the carrier reproduction signal becomes equal to that of the carrier wave of the received signal;

a carrier phase shift multiplication section for shifting the phase of the carrier reproduction signal generated by the carrier signal reproduction section, by 90 degrees, and for outputting a carrier phase shift multiplied signal by multiplying the phase shifted carrier reproduction signal by the received signal, wherein a high frequency component of the carrier phase shift multiplied signal is blocked;

a phase correction signal generation section for generating the phase correction signal to correct a phase shift between the carrier reproduction signal and the received signal, based on the carrier phase shift multiplied signal outputted from the carrier phase shift multiplication section, and for feeding the phase correction signal to the carrier reproduction section;

a multiplication section for outputting a multiplied signal by multiplying the received signal by the carrier reproduction signal, wherein a high frequency component of the multiplied signal is blocked;

a first phase shift section for outputting a first phase shift signal by shifting a phase of the multiplied signal outputted by the multiplication section, by 90 degrees;

a second phase shift section for outputting a second phase shift signal by shifting a phase of the carrier phase shift multiplied signal outputted by the carrier phase shift multiplication section, by 90 degrees;

a signal-to-be-added generation section for dividing one signal of the carrier phase shift multiplied signal outputted by the carrier phase shift multiplication section and the second phase shift signal outputted by the second phase shift section, by the first phase shift signal, and for outputting a signal-to-be-added by multiplying the divided signal by the other signal;

an output section for outputting a detection signal by adding the signal-to-be-added to the multiplied signal;

a time code generation section for generating a standard time code based on the detection signal outputted from the output section; and a transmission section for transmitting the standard time code generated by the time code generation section.

5. A radio wave reception integrated circuit comprising:

a carrier signal reproduction circuit for generating a carrier reproduction signal from a received signal received by an antenna, wherein the carrier reproduction signal has a same frequency as that of a carrier wave of the received signal, and a phase of the carrier reproduction signal is corrected using a phase correction signal so that the phase of the carrier reproduction signal becomes equal to that of the carrier wave of the received signal;

a carrier phase shift multiplication circuit for shifting the phase of the carrier reproduction signal generated by the carrier signal reproduction circuit, by 90 degrees, and for outputting a carrier phase shift multiplied signal by multiplying the phase shifted carrier reproduction signal by the received signal to output the phase shifted carrier reproduction signal as the carrier phase shift multiplied signal, wherein a high frequency component of the carrier phase shift multiplied signal is blocked;

a phase correction signal generation circuit for generating the phase correction signal to correct a phase shift between the carrier reproduction signal and the received signal, based on the carrier phase shift multiplied signal outputted from the carrier phase shift multiplication circuit, and for feeding the phase correction signal to the carrier signal reproduction circuit;

a multiplication circuit for outputting a multiplied signal by multiplying the received signal by the carrier reproduction signal, wherein a high frequency component of the multiplied signal is blocked;

a first phase shift circuit for outputting a first phase shift signal by shifting a phase of the multiplied signal outputted by the multiplication circuit, by 90 degrees;

a second phase shift circuit for outputting a second phase shift signal by shifting a phase of the carrier phase shift multiplied signal outputted by the carrier phase shift multiplication circuit, by 90 degrees;

a signal-to-be-added generation circuit for dividing one signal of the carrier phase shift multiplied signal outputted by the carrier phase shift multiplication circuit and the second phase shift signal outputted by the second phase shift circuit, by the first phase shift signal, and for outputting a signal-to-be-added by multiplying the divided signal by the other signal; and an output circuit for outputting a detection signal by adding the signal-to-be-added to the multiplied signal.

6. The radio wave reception integrated circuit of claim 5, wherein the output circuit comprises a low pass filter, and outputs the detection signal via the low pass filter.

7. A radio wave receiver comprising:
an oscillation section for outputting a signal having a predetermined frequency;
a frequency conversion section for synthesizing a received signal received by an antenna and the signal outputted from the oscillation section, and for converting the synthesized signal into an intermediate frequency signal;
a carrier signal reproduction section for generating a carrier reproduction signal which has a same frequency as that of the intermediate frequency signal and whose phase is corrected using a phase correction signal so that the phase of the carrier reproduction signal becomes equal to that of the intermediate frequency signal;
a carrier phase shift multiplication section for shifting the phase of the carrier reproduction signal generated by the carrier signal reproduction section, by 90 degrees, and for outputting a carrier phase shift multiplied signal by multiplying the phase shifted carrier reproduction signal by the intermediate frequency signal, wherein a high frequency component of the carrier phase shift multiplied signal is blocked;
a phase correction signal generation section for generating the phase correction signal to correct a phase shift between the carrier reproduction signal and the intermediate frequency signal, based on the carrier phase shift multiplied signal outputted from the carrier phase shift multiplication section, and for feeding the phase correction signal to the carrier signal reproduction section;
a multiplication section for outputting a multiplied signal by multiplying the intermediate frequency signal by the carrier reproduction signal, wherein a high frequency component of the multiplied signal is blocked;
a first phase shift section for outputting a first phase shift signal by shifting a phase of the multiplied signal outputted by the multiplication section, by 90 degrees;
a second phase shift section for outputting a second phase shift signal by shifting a phase of the carrier phase shift multiplied signal outputted by the carrier phase shift multiplication section, by 90 degrees;
a signal-to-be-added generation section for dividing one signal of the carrier phase shift multiplied signal outputted by the carrier phase shift multiplication section and the second phase shift signal outputted by the second phase shift section, by the first phase shift signal, and for outputting a signal-to-be-added by multiplying the divided signal by the other signal; and
an output section for outputting a detection signal by adding the signal-to-be-added to the multiplied signal.

8. A wave clock apparatus comprising:
an oscillation section for outputting a signal having a predetermined frequency;
a frequency conversion section for synthesizing a received signal received by an antenna and the signal outputted from the oscillation section, and for converting the synthesized signal into an intermediate frequency signal;
a carrier signal reproduction section for generating a carrier reproduction signal which has a same frequency as that of the intermediate frequency signal and whose phase is corrected using a phase correction signal so that the phase of the carrier reproduction signal becomes equal to that of the intermediate frequency signal;
a carrier phase shift multiplication section for shifting the phase of the carrier reproduction signal generated by the carrier signal reproduction section, by 90 degrees, and for outputting a carrier phase shift multiplied signal by multiplying the phase shifted carrier reproduction signal by the intermediate frequency signal, wherein a high frequency component of the carrier phase shift multiplied signal is blocked;
a phase correction signal generation section for generating the phase correction signal to correct a phase shift between the carrier reproduction signal and the intermediate frequency signal, based on the carrier phase shift multiplied signal outputted from the carrier phase shift multiplication section, and for feeding the phase correction signal to the carrier signal reproduction section;
a multiplication section for outputting a multiplied signal by multiplying the intermediate frequency signal by the carrier reproduction signal, wherein a high frequency component of the multiplied signal is blocked;
a first phase shift section for outputting a first phase shift signal by shifting a phase of the multiplied signal outputted by the multiplication section, by 90 degrees;
a second phase shift section for outputting a second phase shift signal by shifting a phase of the carrier phase shift multiplied signal outputted by the carrier phase shift multiplication section, by 90 degrees;
a signal-to-be-added generation section for dividing one signal of the carrier phase shift multiplied signal outputted by the carrier phase shift multiplication section and the second phase shift signal outputted by the second phase shift section, by the first phase shift signal, and for outputting a signal-to-be-added by multiplying the divided signal by the other signal;

an output section for outputting a detection signal by adding the signal-to-be-added to the multiplied signal;

a time code generation section for generating a standard time code based on the detection signal outputted from the output section;

a time count section for counting a current time; and a time correction section for correcting data of the current time counted by the time count section, based on the standard time code generated by the time code generation section.

9. A repeater comprising:

an oscillation section for outputting a signal having a predetermined frequency;

a frequency conversion section for synthesizing a received signal received by an antenna and the signal outputted from the oscillation section, and for converting the synthesized signal into an intermediate frequency signal;

a carrier signal reproduction section for generating a carrier reproduction signal which has a same frequency as that of the intermediate frequency signal and whose phase is corrected using a phase correction signal so that the phase of the carrier reproduction signal becomes equal to that of the intermediate frequency signal;

a carrier phase shift multiplication section for shifting the phase of the carrier reproduction signal generated by the carrier signal reproduction section, by 90 degrees, and for outputting a carrier phase shift multiplied signal by multiplying the phase shifted carrier reproduction signal by the intermediate frequency signal, wherein a high frequency component of the carrier phase shift multiplied signal is blocked;

a phase correction signal generation section for generating the phase correction signal to correct a phase shift between the carrier reproduction signal and the intermediate frequency signal, based on the carrier phase shift multiplied signal outputted from the carrier phase shift multiplication section, and for feeding the phase correction signal to the carrier signal reproduction section;

a multiplication section for outputting a multiplied signal by multiplying the intermediate frequency signal by the carrier reproduction signal, wherein a high frequency component of the multiplied signal is blocked;

a first phase shift section for outputting a first phase shift signal by shifting a phase of the multiplied signal outputted by the multiplication section, by 90 degrees;

a second phase shift section for outputting a second phase shift signal by shifting a phase of the carrier phase shift multiplied signal outputted by the carrier phase shift multiplication section, by 90 degrees;

a signal-to-be-added generation section for dividing one signal of the carrier phase shift multiplied signal outputted by the carrier phase shift multiplication section and the second phase shift signal outputted by the second phase shift section, by the first phase shift signal, and for outputting a signal-to-be-added by multiplying the divided signal by the other signal;

an output section for outputting a detection signal by adding the signal-to-be-added to the multiplied signal;

a time code generation section for generating a standard time code based on the detection signal outputted from the output section; and a transmission section for transmitting the standard time code generated by the time code generation section.

10. A radio wave reception integrated circuit comprising:

an oscillation circuit for outputting a signal having a predetermined frequency;

a frequency conversion circuit for synthesizing a received signal received by an antenna and the signal outputted from the oscillation circuit, and for converting the synthesized signal into an intermediate frequency signal;

a carrier signal reproduction circuit for generating a carrier reproduction signal which has a same frequency as that of the intermediate frequency signal and whose phase is corrected using a phase correction signal so that the phase of the carrier reproduction signal becomes equal to that of the intermediate frequency signal;

a carrier phase shift multiplication circuit for shifting the phase of the carrier reproduction signal generated by the carrier signal reproduction circuit, by 90 degrees, and for outputting a carrier phase shift multiplied signal by multiplying the phase shifted carrier reproduction signal by the intermediate frequency signal to output the phase shifted carrier reproduction signal as the carrier phase shift multiplied signal, wherein a high frequency component of the carrier phase shift multiplied signal is blocked;

a phase correction signal generation circuit for generating the phase correction signal to correct a phase shift between the carrier reproduction signal and the intermediate frequency signal, based on the carrier phase shift multiplied signal outputted from the carrier phase shift multiplication circuit, and for feeding the phase correction signal to the carrier signal reproduction circuit;

a multiplication circuit for outputting a multiplied signal by multiplying the intermediate frequency signal by the carrier reproduction signal, wherein a high frequency component of the multiplied signal is blocked;

a first phase shift circuit for outputting a first phase shift signal by shifting a phase of the multiplied signal outputted by the multiplication circuit, by 90 degrees;

a second phase shift circuit for outputting a second phase shift signal by shifting a phase of the carrier phase shift multiplied signal outputted by the carrier phase shift multiplication circuit, by 90 degrees;

a signal-to-be-added generation circuit for dividing one signal of the carrier phase shift multiplied signal outputted by the carrier phase shift multiplication circuit and the second phase shift signal outputted by the second phase shift circuit, by the first phase shift signal, and for outputting a signal-to-be-added by multiplying the divided signal by the other signal; and an output circuit for outputting a detection signal by adding the signal-to-be-added to the multiplied signal.

* * * * *